June 11, 1935.  C. DIETRICHS  2,004,465
CEMENT SHINGLE
Filed Feb. 26, 1930
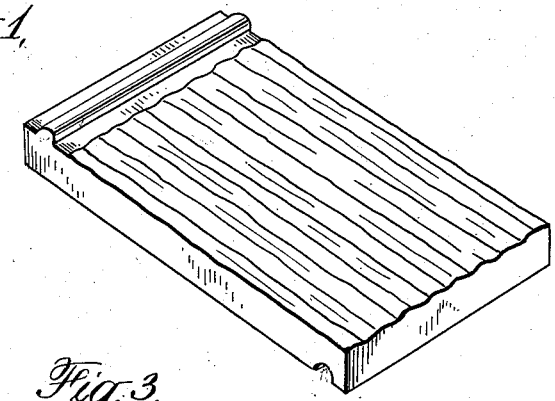
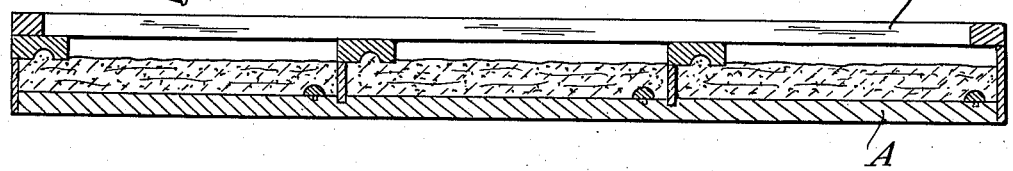
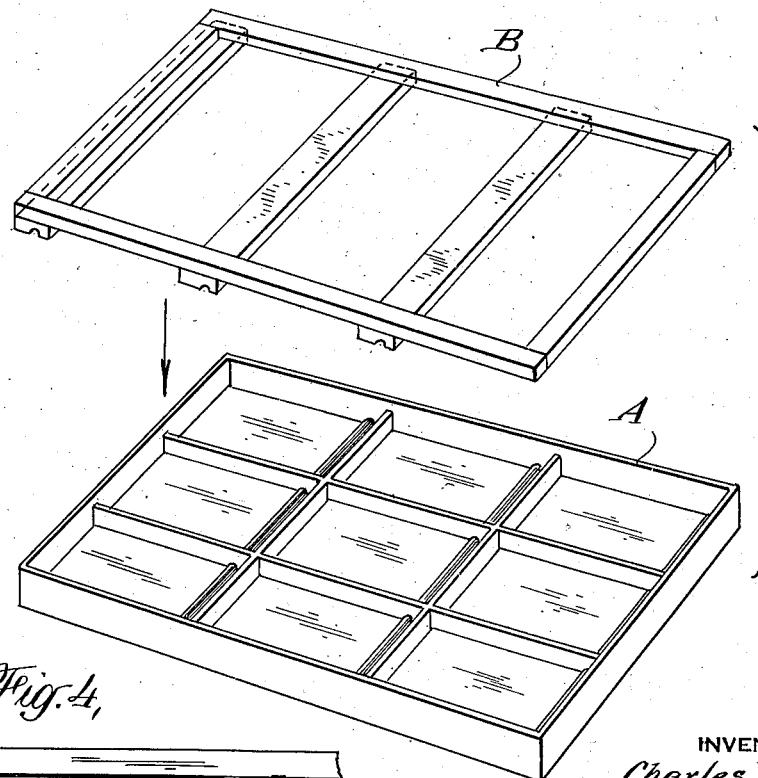
INVENTOR
Charles Dietrichs
BY
Pennie Davis Marvin & Edmonds
ATTORNEYS Patented June 11, 1935

2,004,465

UNITED STATES PATENT OFFICE 2,004,465

CEMENT SHINGLE

Charles Dietrichs, Little Ferry, N. J., assignor to Walker Cement Products, Inc., Little Ferry, N. J., a corporation of New Jersey Application February 26, 1930, Serial No. 431,445

5 Claims. (Cl. 18—60)

This invention relates to cement shingles and a method of making the same, and has for its object to produce a cement shingle which may be used in the construction of roofs in the same manner as slate shingles or the like, that is, by nailing the shingles directly to the wood sheathing.

A further object of the invention is to provide an improved shingle of this kind which is not unduly heavy and which makes a roof of pleasing appearance closely simulating the appearance of natural rough hewn slate now largely used for ornamental roofs.

A further object of the invention is to provide a shingle of this class which may be made in any color or colors desired, either with different colors confined to separate portions of the shingle, or with the colors overlapping, producing the two-tone effect characteristic of weathered roofing.

A further object of the invention is to provide a shingle of this class which is not affected by the weather, which will retain its colors permanently and which is of low manufacturing cost compared with other types of roofing.

In the accompanying drawing I have illustrated my improved shingle and a simple apparatus whereby the process of manufacturing may be carried out.

In said drawing:

Figure 1 is a perspective view of my improved shingle;

Fig. 2 shows a mold and platen which may be employed for molding the shingle;

Fig. 3 illustrates a step in the method of manufacture whereby an attractive finished surface may be secured; and Fig. 4 is a view similar to Fig. 2, of a portion of a modified form of mold and platen.

To manufacture my improved shingle, I first make up a batch of cement according to the following formula:

1 sack of cement (approximately 100 pounds)
200 pounds of sand
1 gallon of asphalt oil
5 pounds of calcium chloride
2 or 3 pounds of cocoanut fibre.

To this is added a pigment composition sufficient to color the batch. Enough water is added to the batch to give the desired consistency, which will be varied according to the surface effect which it is desired to obtain. Generally speaking, the consistency will be such that when the batch is poured into the mold it will be just too thick to flow freely and produce a smooth, flat surface. This consistency may readily be obtained by adding enough water to produce a batch capable of flowing and then stirring in additional dry material to thicken the batch as required.

Any suitable pigment as heretofore employed for coloring cement, may be employed. I find that a uniform coloring of the batch can be best secured by mixing the desired pigments with sufficient oil to form a thick paste, then thoroughly mixing this paste into a portion of the cement which is to be added to the batch, in the proportion, for example, of one part of the color mixture to ten parts of cement, with sufficient water to make a thin batch. This small batch of cement added to the cement mixture will affect and uniformly color the whole batch.

After the batch of cement is filled into the mold A and leveled off to produce shingles of the desired thickness, the platen B is pressed down to the exposed surface of the cement, thereby, as shown in Fig. 2, shaping the face of the shingle along the edge where it is to be overlapped to fit the under side of the exposed edge of the shingle as formed by the bottom of the mold. As shown, the bottom of the mold is formed with beads to produce a groove in the under side of the shingle, and the platen is provided with grooves for forming corresponding beads or ridges in the upper face of the shingle. The strips making up the platen are forced down into the cement sufficiently to make a contact with the strips C forming the divisions between the shingles, thereby forming a smooth surface across the edge of the shingle so that the overlapped shingles will fit closely together.

While the cement is in the mold, and before it is set, the surface may be roughened in any desired manner. One method which I have found to produce pleasing effects without requiring any particular skill and experience, is to blow the surface of the cement with air at comparatively low pressure. Any suitable pressure may be employed if properly controlled. I have found that about fifteen pounds pressure can be readily handled with an ordinary spring valve nozzle such as illustrated, in handling cement. The blast of air against the surface will form ridges in the cement according to the direction of discharge of the air. The cement tends to flow back to the level surface but if of proper consistency the ridges will remain but there will be some flow, leaving an undulating surface as distinguished from a surface presenting sharp edges. The degree of flow will of course depend on the consistency of the cement so that all sorts of different effects may be readily had. As soon as the cement is set the shingles are removed from the mold and allowed to harden thoroughly before being applied to the roof.

I have found that shingles so made may be attached to the roof by nailing without previously punching holes for the nails. The cocoanut fibre prevents the shingles from cracking when the nails are driven through it. This fibre also assists in preserving the rough surface of the shingle, giving a surface texture to the shingle very similar to that of rough hewn slate. The oil makes the mixture waterproof and the calcium chloride aids in producing a dense, glazed surface.

If it is desired, the nail holes may be readily molded in the shingle by the simple expedient of providing the platen strips with nails as shown in Fig. 4. If the nails are slightly greased just before the platen is forced down into the shingle, the platen can be removed without difficulty, leaving nail holes in the ridges along the upper edge of the shingles.

A pleasing two-tone effect may be had by placing a second and differently colored layer of cement over the top of the shingle before using the air gun. This surface mixture should be made with oil and calcium chloride in a quantity at least as great as that employed in the main batch, in order that the surface may have the desired qualities. This second layer of cement is spread on thin so that when treated with the air gun it will be blown away in spots, exposing the color of the batch beneath. Three-color effects may be similarly obtained and also different shingles and different parts of the same shingle may be differently colored.

Another method which may be employed to give pleasing surface effects is to brush the surface of the cement after the mold is filled, with an ordinary whisk broom. Both the two-tone and three-tone effects may be so produced.

I claim:

1. The method of forming cement shingles which comprises pouring a suitable cement mixture containing a pigment into a mold for shaping the under side of the shingle, applying to the exposed surface a second thin layer of cement containing a differently colored pigment and then treating the upper surface while still plastic to shift parts of said second layer from their original positions to different positions on the surface so as to produce irregular undulations and thereby to uncover in irregular areas portions of the underlying layer.

2. The method of forming cement shingles which comprises pouring a suitable cement mixture containing a pigment into a mold for shaping the under side of the shingle, applying to the exposed surface a second thin layer of cement containing a differently colored pigment and then treating the upper surface with an air blast to produce irregular undulations and to uncover in irregular areas portions of the underlying layer.

3. The method of forming cement shingles which comprises pouring a cement mixture of suitable consistency into a mold for shaping the under side of the shingle and then treating the upper surface of the same with an air blast to produce irregular undulations in the shingle surface, the cement mixture being sufficiently plastic to permit the formation of the undulations in the surface thereof under the influence of the air blast and yet sufficiently stiff to prevent the undulations from disappearing before the material hardens.

4. The method of forming cement shingles which comprises pouring a cement mixture into a mold for shaping the under side of a shingle, and then blowing with a jet of air the upper surface of the cement to form ridges therein, the cement mixture being of such consistency that said ridges will remain sufficiently to produce an undulating surface in the shingle.

5. The method of forming cement shingles which comprises pouring a cement mixture into a mold for shaping the under side of the shingle, and then blowing the upper surface of said mixture with a jet of air at about fifteen pounds pressure per square inch thereby forming ridges in the surface of said mixture, the mixture being of such consistency that said ridges will remain sufficiently to produce an undulating surface in the shingle.

CHARLES DIETRICHS.